US007370006B2

(12) United States Patent
Kopelman et al.

(10) Patent No.: US 7,370,006 B2
(45) Date of Patent: May 6, 2008

(54) METHOD AND APPARATUS FOR LISTING GOODS FOR SALE

(75) Inventors: Joshua M. Kopelman, Wynnewood, PA (US); Christopher D. Fralic, New Hope, PA (US); Srinivas Balijepalli, Devon, PA (US)

(73) Assignee: eBay, Inc., San Jose, CA (US)

( * ) Notice: Subject to any disclaimer, the term of this patent is extended or adjusted under 35 U.S.C. 154(b) by 1351 days.

(21) Appl. No.: 09/935,287

(22) Filed: Aug. 22, 2001

(65) Prior Publication Data
US 2002/0049641 A1 Apr. 25, 2002

Related U.S. Application Data

(63) Continuation-in-part of application No. 09/427,958, filed on Oct. 27, 1999.

(51) Int. Cl.
*G06Q 30/00* (2006.01)
(52) U.S. Cl. .................................................. 705/27
(58) Field of Classification Search .............. 705/26, 705/27, 37
See application file for complete search history.

(56) References Cited

U.S. PATENT DOCUMENTS

| 4,613,946 A |   | 9/1986 | Forman .................... 364/518 |
| 4,799,154 A |   | 1/1989 | Matthews et al. ............ 705/26 |
| 4,799,156 A | * | 1/1989 | Shavit et al. ................ 705/26 |
| 5,283,731 A | * | 2/1994 | Lalonde et al. ............... 705/1 |
| 5,592,375 A |   | 1/1997 | Salmon et al. ............. 395/207 |
| 5,664,111 A |   | 9/1997 | Nahan et al. ................. 705/27 |
| 5,715,402 A |   | 2/1998 | Popolo ..................... 395/237 |
| 5,732,400 A |   | 3/1998 | Mandler et al. ............. 705/26 |
| 5,790,790 A |   | 8/1998 | Smith et al. ........... 395/200.36 |

(Continued)

FOREIGN PATENT DOCUMENTS

EP 0957437 11/1999

(Continued)

OTHER PUBLICATIONS

Mothers' Online Thrift Shop [online][excerpts printed on Jun. 17, 2000-Jun. 19, 2000]. Retrieved from http://www.motshop.com.

(Continued)

*Primary Examiner*—Gerald J O'Connor
(74) *Attorney, Agent, or Firm*—Synnestvedt & Lechner LLP

(57) ABSTRACT

A method for using a telephone to list a seller's good for sale on a website including the steps of receiving good-identifying information from a seller via a telephone and presenting the good for sale on a website. The good-identifying information may be received as a series of tones generated by depression of keys of a telephone. The tones may optionally be used to navigate through a voice prompt system or to provide information about the good, such as the good's UPC code, ISBN number and/or characteristics of the good. The seller's provision of a standard identification code allows the marketeer to retrieve information relating to the good from a database and to use such information to present the good for sale. Such information, and/or the characteristics provided by the seller that are specific to the good may optionally be used to set or recommend a price for the good.

18 Claims, 4 Drawing Sheets

U.S. PATENT DOCUMENTS

| | | | |
|---|---|---|---|
| 5,797,127 A | 8/1998 | Walker et al. | 705/5 |
| 5,825,881 A | 10/1998 | Colvin, Sr. | |
| 5,842,199 A | 11/1998 | Miller et al. | |
| 5,845,265 A | 12/1998 | Woolston | 705/37 |
| 5,897,622 A | 4/1999 | Blinn et al. | |
| 5,918,213 A * | 6/1999 | Bernard et al. | 705/26 |
| 5,950,178 A | 9/1999 | Borgato | 705/37 |
| 5,960,411 A | 9/1999 | Hartman et al. | 705/26 |
| 6,012,045 A * | 1/2000 | Barzilai et al. | 705/37 |
| 6,016,475 A | 1/2000 | Miller et al. | |
| 6,016,504 A | 1/2000 | Arnold et al. | 709/200 |
| 6,029,141 A | 2/2000 | Bezos et al. | 705/27 |
| 6,047,264 A | 4/2000 | Fisher et al. | 705/26 |
| 6,055,513 A | 4/2000 | Katz et al. | |
| 6,061,448 A | 5/2000 | Smith et al. | 380/21 |
| 6,064,967 A * | 5/2000 | Speicher | 705/1 |
| 6,076,070 A | 6/2000 | Stack | 705/20 |
| 6,085,176 A | 7/2000 | Woolston | 705/37 |
| 6,101,484 A | 8/2000 | Halbert et al. | |
| 6,108,493 A | 8/2000 | Miller et al. | |
| 6,119,101 A | 9/2000 | Peckover | |
| 6,119,137 A | 9/2000 | Smith et al. | 707/523 |
| 6,178,408 B1 | 1/2001 | Copple et al. | 705/14 |
| 6,192,407 B1 | 2/2001 | Smith et al. | 709/229 |
| 6,202,051 B1 | 3/2001 | Woolston | 705/27 |
| 6,243,691 B1 | 6/2001 | Fisher et al. | 705/37 |
| 6,292,786 B1 * | 9/2001 | Deaton et al. | 705/14 |
| 6,308,168 B1 | 10/2001 | Dovich et al. | |
| 6,321,221 B1 | 11/2001 | Bieganski | |
| 6,334,127 B1 | 12/2001 | Bieganski et al. | |
| 6,356,879 B2 | 3/2002 | Aggarwal et al. | |
| 6,412,012 B1 | 6/2002 | Bieganski et al. | |
| 6,415,269 B1 * | 7/2002 | Dinwoodie | 705/37 |
| 6,418,441 B1 * | 7/2002 | Call | 707/10 |
| 6,625,581 B1 * | 9/2003 | Perkowski | 705/27 |
| 6,691,914 B2 * | 2/2004 | Isherwood et al. | 235/375 |
| 2001/0037255 A1 | 11/2001 | Tambay et al. | |
| 2002/0143660 A1 | 10/2002 | Himmel et al. | |
| 2002/0156686 A1 | 10/2002 | Reiner et al. | |
| 2002/0184116 A1 | 12/2002 | Tam et al. | |
| 2003/0093331 A1 | 5/2003 | Childs et al. | |

FOREIGN PATENT DOCUMENTS

| | | |
|---|---|---|
| WO | WO 99/07121 | 11/1999 |
| WO | WO-0017792 | 3/2000 |
| WO | WO-0017793 | 3/2000 |
| WO | WO-0045319 | 8/2000 |
| WO | WO-0116848 | 3/2001 |
| WO | WO-0131537 | 5/2001 |
| WO | WO-0133401 | 5/2001 |
| WO | WO-0219203 | 3/2002 |
| WO | WO-0229695 | 4/2002 |
| WO | WO-02037926 | 5/2002 |
| WO | WO-0129726 | 4/2004 |

OTHER PUBLICATIONS

"Method For Buying and Selling Merchandise In A Network Of Users," a document alleged to have been filed as a patent application around Jun. 1999.

@MOTSHOP.COM, "Mothers' Online Thrift Shop", *Storefront Development Corporation, at Mothers' Online Thrift Shop*, (http://www.motshop.com) excerpts printed Jun. 17, 2000-Jun. 19, 2000, 25.

AMAZON, "Amazon.com: Books", [online] [Retrieved on Jul. 8, 2002] Retrieved from the Internet using <URL http://www.amazon.com/exec/obidos/tg/browse/-/283155/ref=tab_qw_b_3/102-9150031-1671331 (3 pp.), (Jul. 8, 2002).

AMAZON, "An exemplary online retail seller was accessible at the time of filing of the above-identified applicatin", Via the Internet URL http://www.amazon.com, (Mar. 3, 2000).

BOOKPRICE, "BookPrice Compare.com Coupons and discounts", [[online] [Retrieved on Jul. 8, 2002] Retrieved from the Internet using <URL http://www.bookpricecompare.com/bin/search.cgi?find=Compare&A_0618037667=1 (1 p.), (Jul. 8, 2002).

BOOKS.COM, "An exemplary online shopping agent was accessible at the time of filing of the above-identified application", Via the Internet URL http://www.books.com, (Mar. 3, 2000).

EBAY, "An Exemplary online at the time of iling of the above-identified application", Via the Internet URL http://www.ebay.com, (Mar. 3, 2000).

EBAY, "eBayListing: Action & Adventure", [online] [Retrieved on Jul. 8, 2002] Retrieved form the Internet using <URL httpL//listing.ebay.com/aw/plistings/list/allcategory271/index.html?ssPageName=bookhubactionadventure (4 pp), (Jul. 8, 2002).

Iacobucci, et al., "Recommendation agents on the Internet", *Journal of Interactive Marketing*, v14n3, Jul. 1, 2000, pp. 2-11, (Jan. 7, 2000).

Kumar, P., et al., "Recommendation Systems", *A probabillistic analysis J. Computer Systems Science* vol. 63, No. 1, Aug. 2001, pp. 42-61.

McDonald, D., et al., "Expertise Recommender", *A Flexible Recommendation System and Architecture, Department of Information and Computer Sicence*, 10 pages.

PRICELINE, "Priceline.com", Name your own price and save on airline tickets, hotelrooms, new cars, home mortgages...[online] [Retrieved on Jul. 8, 2002]Retrieved from the Internet using <URL http://wwwpriceline.com/customerservice/faq/howitworks/howitworks.asp?session_key=D10011AC23001, (Jul. 8, 2002).

PRICELINE.COM, "An exemplary online reverse-auction was accessible at the time of filing of the above-identified application", Via the Internet URL http://www.priceline.com, (Mar. 3, 2000).

Schafer, J B., et al., "E-Commerce Recommendation Applications", *GroupLens Research Project Dept. of Computer Science & Engineering*, University of Minnesota, Minneapolis, MN 55455., 1-24.

Storefront Development Corp., "Methdo For Buying And Selling Merchandise in A Network Of Users", Excerpt of document titled "Method for Buying and Selling Merchandise In A Network of Users", a document alleged to have been filed as a patent application around Jun. of 1999., (Jun. 12, 2000), 17.

\* cited by examiner

METHOD AND APPARATUS FOR LISTING GOODS FOR SALE

RELATED APPLICATIONS

This application is a continuation-in-part of U.S. application Ser. No. 09/427,958, filed Oct. 27, 1999, and this application claims the benefit of U.S. Provisional Patent Application No. 60/313,615 titled "Method and Apparatus for Listing Goods for Sale", filed Aug. 20, 2001, the disclosures of both of which are hereby incorporated herein by reference.

FIELD OF THE INVENTION

This invention relates generally to the field of sales of goods and particularly to a method and apparatus for using a telephone to list goods for sale in electronic commerce applications.

BACKGROUND OF THE INVENTION

The industrial age has given rise to a global economy of factories engaged in mass production of various goods. An enormous amount of commerce is transacted in the buying and selling of such goods. While some such goods lose their value with use, e.g., food products, many such goods retain a substantial portion of their value even after use or ownership by another. Such goods are referred to herein as "durable". A considerable amount of commerce is transacted in the buying and selling of durable goods, particularly used durable goods.

Almost all durable goods are readily identifiable by a standard product identification code ("ID code") that uniquely identifies the good, particularly those that are mass produced. In the case of computer software, music cassettes or compact discs, videocassettes and digital video discs, the ID code may be a human readable Universal Product Code ("UPC"), a thirteen digit ID code that is widely used to readily identify the good. In the case of books, magazines or other publications, the ID code may be a human readable ten-digit International Standard Book Number ("ISBN"). Other items are more readily identified by a manufacturer or brand name and a model number, as for baseball cards and consumer electronics, e.g., a Sony® KV-3620 television. Some goods may be identifiable by more than one type of ID code.

U.S. application Ser. No. 09/427,958, discloses a method and apparatus for facilitating sales of goods, particularly, used durable goods, by independent parties. In addition, U.S. application Ser. No. 09/427,958, discloses a method for pricing such goods for sale which exploits the fungible and readily identifiable nature of such goods, e.g., by allowing a seller to list a good for sale by identifying it by a product identification code that is affixed to the good and/or its packaging.

Such a method is particularly convenient for sellers of a single item or items which may be easily transported to a computer station so that the seller may read the product identification code from the item and use the computer to enter the product identification code and list the good for sale. The good may be listed for sale by using the computer to transmit the product identification code and related information to the marketplace, e.g., website. Alternatively, the product identification code and/or related information may be transmitted to the entity controlling the marketplace, referred to herein as the marketeer. However, such a method is inadequate for items stored in locations remote from a computer and are not easily transported, e.g., for large items or items stored in large quantities.

Telephone based interfaces for interacting with websites are known. For example, Tellme Networks, Inc. of Mountain View, Calif. (URL http://www.tellme.com) has developed a voice-based telephone interface by which users can use certain voice commands to hear information in selected categories that Tellme Networks, Inc. retrieves from the Web and transforms into audio signals. Audium Corp. (formerly Phone2Networks, Inc.) of New York, N.Y. has developed interfaces for using a telephone, rather than a computer, to interact with a website and/or the Internet. For example, Audium Corp. offers services including Phone2Bid to track and bid on an online auction, Phone2Compare (formerly Phone2Books) to get the real time prices from online vendors, and Phone2Quotes to get custom stock portfolio updates. Information regarding these services was available on the World Wide Web at the time of filing of this application at URL http://www.audiumcorp.com/products/

SUMMARY OF THE INVENTION

The invention provides a method for using a telephone to list a seller's good for sale on a website. In one embodiment, the method includes the steps of receiving good-identifying information from a seller via a telephone, retrieving information relating to the good from a database, and using the retrieved information to present the good for sale on a website.

In another embodiment, the method includes the steps of receiving good-identifying information from a seller via a telephone in the form of a series of tones generated by depression of keys of a telephone, and subsequently presenting the good for sale on a website. The tones may optionally be used to navigate through a voice prompt system or to provide information about the good, such as the good's UPC code, ISBN number and/or characteristics of the good, such as the good's "like new" or "poor" condition. The seller's provision of a standard identification code allows the marketeer to retrieve information relating to the good from a database and use such information to present the good for sale. Such information, and/or the characteristics provided by the seller that are specific to the good, may optionally be used to set or recommend a sale price for the good.

In accordance with the present invention, a seller may list goods for sale on a website without the need for a computer, making it convenient to list goods for sale from a location where no computer is present, such as a warehouse, garage, attic, or basement, but where a telephone is accessible or may be used.

DETAILED DESCRIPTION

Websites providing a computer-based, i.e., Web, interface for listing goods for sale on a website are known. Examples of such websites include a marketplace accessible via the Internet at URL http://www.half.com, maintained by Half-.com Inc. of Plymouth Meeting, Pa., and an auction-based website accessible via the Internet at URL http://www.ebay.com maintained by eBay Inc. of San Jose, Calif.

The present invention provides a method for listing goods for sale on a website using a telephone, such as a cordless or cellular telephone. Information that could be communicated between the seller and the marketeer using a Web-based interface is communicated to the marketeer via telephone, which makes it easier for the seller to provide such information from locations in which a computer for accessing the Web-based interface is not available. For example, a wireless telephone could be used in an attic of a garage where goods are stored but where no computer is available for accessing a Web-based interface.

Figure 1:
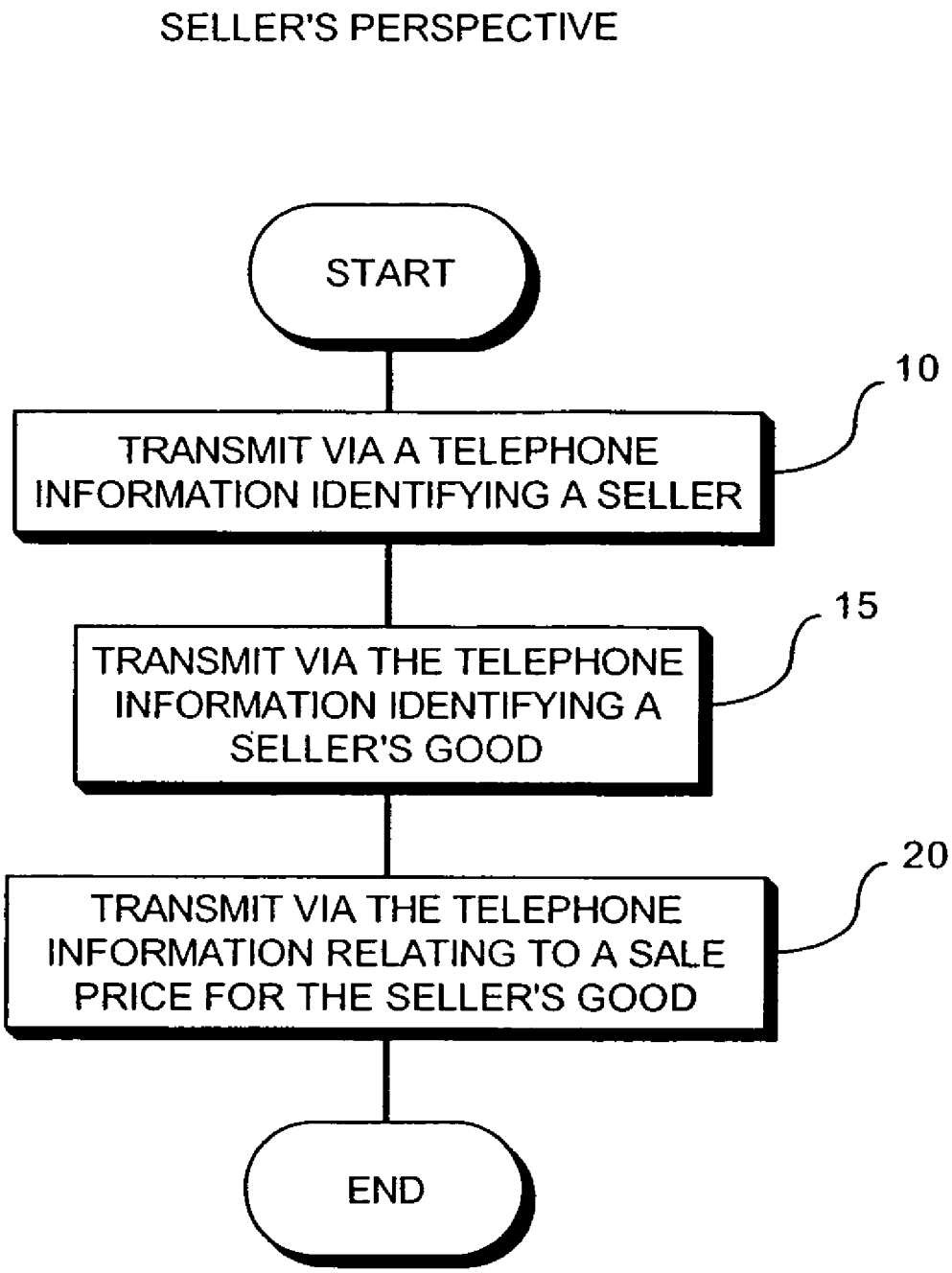
FIG. 1 is a flow diagram of an exemplary transaction in accordance with one embodiment of the present invention, shown from a seller's perspective.

FIG. 1 is a flow diagram of an exemplary transaction in accordance with one embodiment of the present invention, shown from a seller's perspective. As shown in FIG. 1, the seller first transmits via a telephone information identifying the seller to the marketeer, as shown at step 10. The seller may do so affirmatively, for example, by dialing a designated telephone number of the marketeer using a telephone and, when prompted to do so, depressing the keys of the telephone in a sequence corresponding to an alphanumeric sequence of a seller's identification code, account code and/or personal identification number (PIN), e.g. as assigned by the marketeer and/or as previously selected by the seller. As used herein, "alphanumeric sequence" refers to a sequence including letters, numbers, and/or other symbols. The depression of the keys causes the telephone to generate a series of tones, i.e., pulses for a pushbutton rotary phone, or dual-tone multi-frequency (DTMF) tones for a touch tone telephone, as is well known in the art. These tones are recognizable by the marketeer's equipment, which translates the tones into a seller identification code, which is recognizable by the marketeer to identify the seller or an account of the seller or an account to be used by the seller. The seller identification code may be assigned by the marketeer or selected by the seller. Equipment for recognizing such tones are well known in the art. Alternatively, the seller may transmit such information passively. For example, the telephone number of the telephone used by the seller may be recognized using a caller identification technique function, as is well known in the art, and that telephone number may be used to identify the seller. This information may be used by the marketeer to identify an account and/or other seller information previously provided to the marketeer, e.g., the seller's name, address, etc.

The seller then transmits via the telephone information identifying the good to be offered for sale, as shown at step 15. In one embodiment, the seller may provide such information by using the telephone's keys to navigate through a voice prompt system. For example, the seller may be provided with voice prompts to assist the seller to identify his good, e.g., "Press 1 for books, 2 for music, 3 for videos . . . ", etc. Voice-prompt telephone systems are well known in the art. In the preferred embodiment, the seller is instructed to depress the keys of a telephone to provide a standard identification code which uniquely identifies the good, such as a UPC code or ISBN number. In another embodiment, the seller may speak letters and/or numbers of the identification code. In such an embodiment, the marketeer may use equipment having speech recognition software for recognizing the seller's speech and translating it into electronic data.

The seller then transmits via the telephone information relating to a sale price for the seller's good, as shown at step 20. For example, the seller may use the telephone's keys to select a sale price from a menu of sale prices, e.g., "Press 1 for $5, 2 for $10 . . . ", etc. Alternatively, the seller may use the telephone's keys to enter a sale price for the seller's good, e.g., $7 by pressing the 7 key. In the preferred embodiment, the seller is also provided opportunities, during the same and/or subsequent calling sessions, to revoke and/or modify the listing of the good, e.g., the condition, the selling price, etc. Thus, an independent seller may use a telephone to list the seller's good for sale on the marketeer's website.

Figure 2:
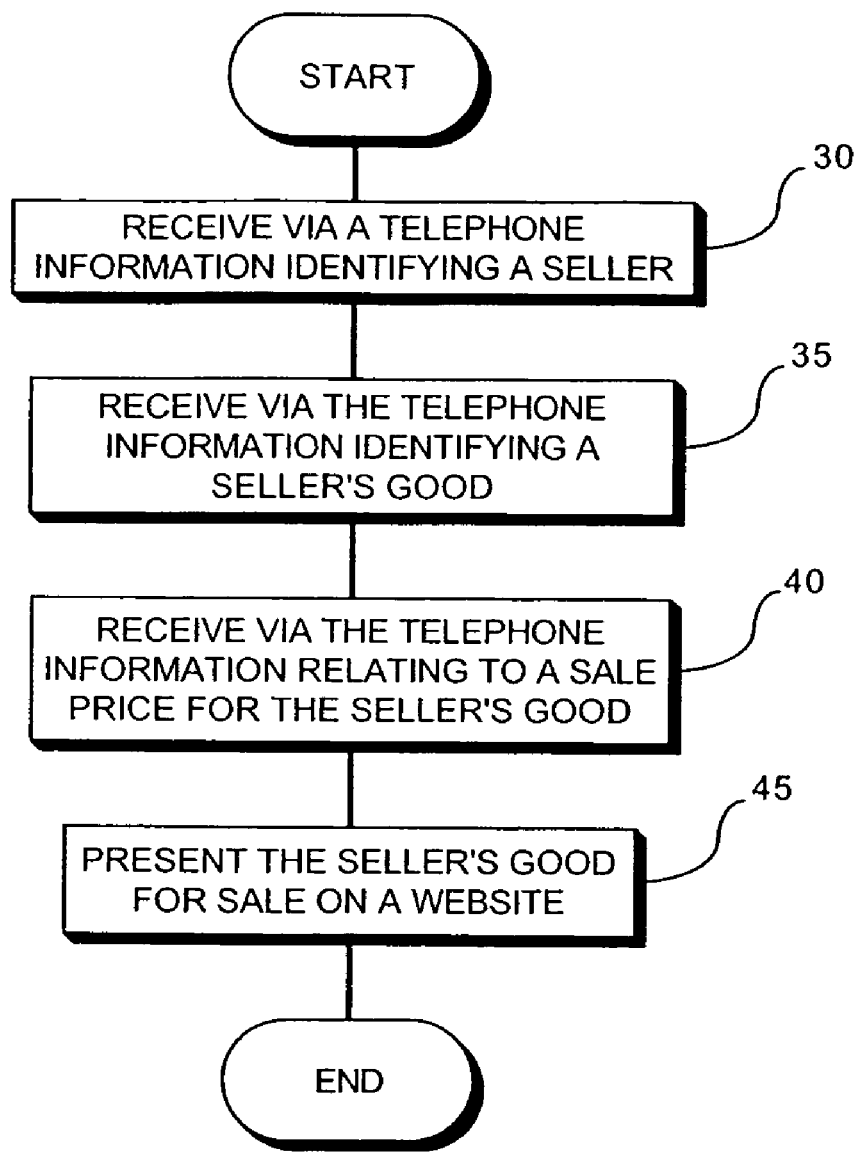
FIG. 2 is a flow diagram of the exemplary transaction of FIG. 1, shown from a marketeer's perspective.

FIG. 2 is a flow diagram of the exemplary transaction of FIG. 1, shown from a marketeer's perspective. As shown in FIG. 2, the marketeer first receives via a telephone information identifying a seller, as shown at step 30 and described above. Information identifying the seller's good is then received via the telephone, as shown at step 35 and described above. The marketeer then receives information relating to a sale price for the seller's good, as shown at step 40. Such information may include a price set by the seller, or information for determining a price recommended or set by the marketeer.

As shown in step 45, the marketeer presents the seller's good for sale on a website, e.g. the marketeer's website, using the information provided by the seller. Methods and apparatuses for presenting a good for sale on a website are well known. For example, the marketeer may add the information provided by the seller to its database of goods for sale. The good need not be displayed on the website. Rather, if a buyer later wishes to buy the good and makes an inquiry to the marketeer, the marketeer provides the potential buyer with the information provided by the seller and/or other information about the seller's good which the marketeer may retrieve from a database of information using the information provided by the seller, e.g., cover art, descriptions, title, author, reviews, etc. for a book identified by the seller, or cover art, description, title, artist, song list, etc. for a music compact disc identified by the seller.

Figure 3:
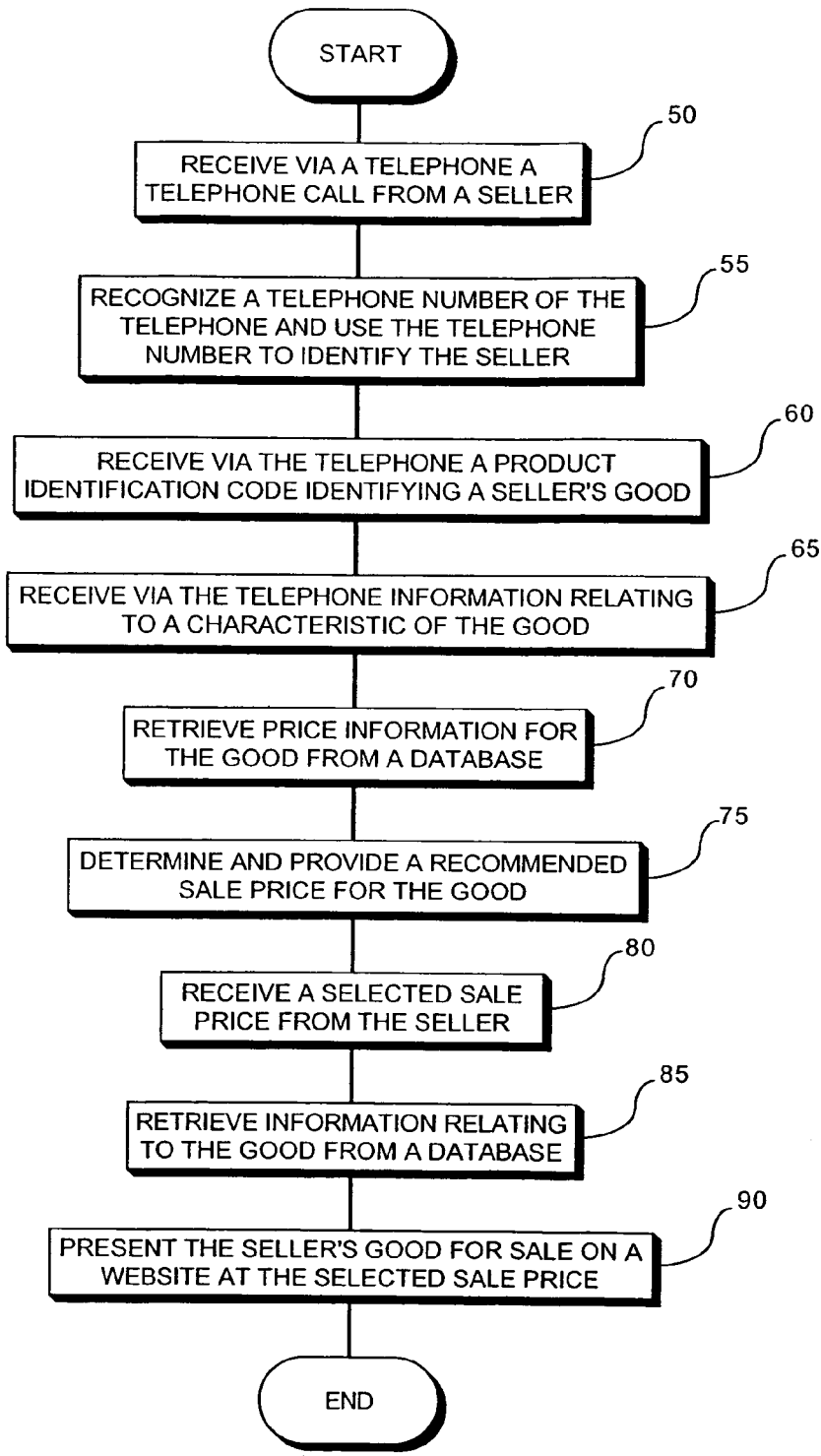
FIG. 3 is a flow diagram of an exemplary transaction in accordance with an alternate embodiment of the present invention, shown from a marketeer's perspective.

FIG. 3 is a flow diagram of an exemplary transaction in accordance with an alternate embodiment of the present invention, shown from a marketeer's perspective. In this embodiment, the marketeer first receives a telephone call from the seller, as shown at step 50. The marketeer then recognizes a telephone number of the telephone used by the seller and references a database of seller information to determine an identity of the seller associated with the telephone number, as shown at step 55. In one embodiment, the seller is prompted to enter a personal identification number (PIN) to verify that the seller has permission to use the account identified. The marketeer preferably provides a message prompting the seller to enter a standard product identification code identifying the good, such as a UPC or ISBN code using the keys of the seller's telephone. The seller then provides such information by depressing an appropriate sequence of keys of the telephone and the marketeer receives such information, as shown at step 60.

The marketeer also provides a message prompting the seller to transmit information relating to a characteristic of the good, e.g., those characteristics that are specific to the seller's good and cannot be discerned from the standard product identification code. For example, the characteristic may be a condition of the good, e.g., that the good is in new, very good, fair or poor condition. The seller provides such information by depressing appropriate telephone keys, e.g., "Press 1 for a good in "like new" condition, press 2 for a good in "very good" condition . . . ", etc. and the marketeer receives such information, as shown at step 65.

In the embodiment of FIG. 3, the marketeer uses the product identification code to retrieve price information for a comparable good, e.g., a new good, from a database of price information, as shown at step 70. The marketeer then uses the characteristic information provided in step 65 to calculate a recommended price for the seller's good, e.g., a used good in "like new" condition may be priced at a discount of 50% from the price for a comparable new good. In one embodiment, the marketeer may also specify a maximum allowable price using a marketeer-specified method, e.g., no more than half of a manufacturer's suggested retail price of a similar, new good. The marketeer then provides the recommended sale price to the seller, e.g., by a voice message transmitted via the seller's telephone, as shown at step 75. The seller is presented with options to select the recommended sale price by depressing a key to confirm, or to alternatively use the telephone's keys to enter a selected sale price, as shown at step 80. The seller's identity, the product identification code for the seller's good, and related characteristic and/or price information is stored by the marketeer and the good is added to the marketeer's virtual inventory of goods for sale. The inventory is "virtual" in that the marketeer need not take possession of the good to have it in its inventory. Rather, the identification, or "listing", of the seller's good in the marketeer's database of sale items is sufficient to place the good in the marketeer's virtual inventory. In this manner, a buyer may find the good when browsing the marketeer's website.

Additionally, the product identification code may be used to retrieve information relating to the good from a database of information, e.g., cover art, critics or buyers' reviews of a book, a song list for a compact disk, etc., as shown at step 85 and discussed above. This information may be displayed on the marketeer's website to present the good for sale, as shown at step 90, e.g., after a buyer inquires about the good. For example, a buyer may browse the website, search for a book by author, and once the book is found by the marketeer and selected by the buyer, the product identification code for the book is checked against the marketeer's virtual inventory, the seller's listing of the book is found, and the cover art and book review from the database of related information is displayed along with the seller-provided condition of the good and selected sale price. In this alternate manner, the seller's good is presented for sale on the marketeer's website.

The information transmitted by the seller and received by the marketeer may advantageously be received by automated systems, e.g., computers, i.e., Web servers, in real time. In this manner ,the marketeer's website is updated and the seller's good is presented for sale, in real time, i.e., almost instantaneously.

In this manner, sellers may list goods for sale on a website without the need for a computer-based interface to list good for sale. The method therefore provides sellers with an opportunity to list goods for sale using a wireless telephone, e.g., from a location where a computer for accessing a website is not available, such as a warehouse, basement, attic, garage, or other location.

Figure 4:
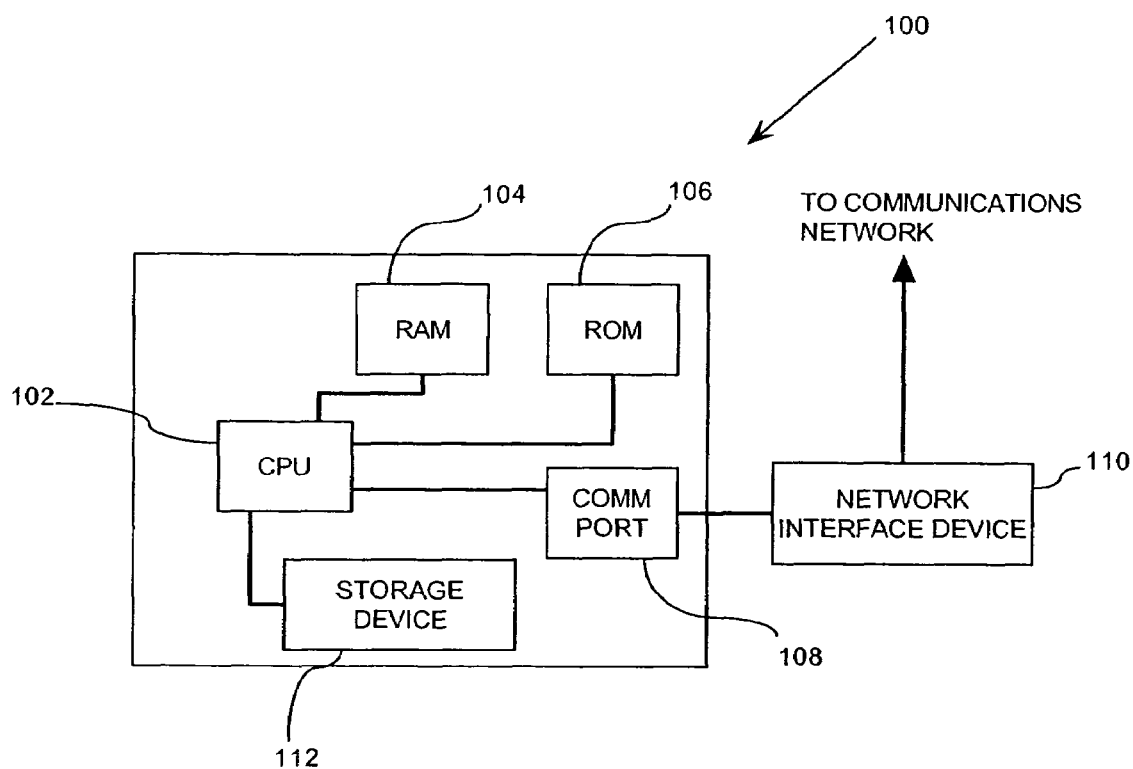
FIG. 4 is a block diagram of a marketeer controller in accordance with the present invention.

FIG. 4 is a block diagram of a marketeer controller 100 in accordance with the present invention. The marketeer controller includes a central processing unit ("CPU") 102, random access memory ("RAM") 104, read only memory ("ROM") 106, and a communications port ("COMM PORT") 108 connected to a network interface device 110 for communicating over a communications network. The marketeer controller 100 also includes a storage memory including a storage device 112 for storing data including a first program a first program for receiving via a telephone information relating to a seller's good, a second program for storing electronic data relating to a seller's good, and a third program for presenting the seller's good for sale on a website. The marketeer controller may optionally include a video driver (not shown) and may optionally be connected to a video monitor (not shown) and or an input device (not shown), such as a mouse or keyboard.

In one embodiment, the information received by said the program is configured to recognize a series of tones generated by depression of keys of a telephone. In another embodiment, the marketeer controller includes a fourth program for recognizing speech in embodiments in which the information received by the first program is a spoken voice signal of the seller. Optionally, the marketeer controller may include a fifth program for retrieving information relating to the good from a database. In such an embodiment, the information retrieved by the fifth program may be used by the third program to present the seller's good for sale on the website.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A computer-implemented method for listing an independent seller's good for sale using a CPU, a memory operatively connected to the CPU and a program stored in the memory and executable by the CPU for presenting the good for sale on a website, the method comprising:
   receiving from a seller information identifying a good, the information comprising a series of tones generated by depression of keys of a telephone; and presenting the good for sale on a website;
   wherein the telephone is a touch tone telephone and wherein the series of tones comprises tones generated by depressing the telephone's keys in a sequence corresponding to an alphanumeric sequence of a standard identification code.

2. The method of claim 1, wherein the standard identification code is a universal product code.

3. The method of claim 1, wherein the standard identification code is an international standard book number.

4. The method of claim 1, wherein the information identifying the good identifies a characteristic of the good in addition to an identity of the good, the characteristic of the good being incapable of being discerned from the standard identification code, the identity of the good being discernable from the standard identification code.

5. The method of claim 1, further comprising:
   using said standard identification code to reference a database;
   retrieving from the database information relating to the standard identification code, said information including a recommended sale price for the good;
   providing the recommended sale price to the seller; and
   receiving from the seller a selected sale price;
   wherein the information relating to the standard identification code is used to present the good for sale.

6. The method of claim 1, further comprising:
   using said standard identification code to reference a database;

retrieving from the database information relating to the standard identification code, said information including a recommended sale price for the good;

providing the recommended sale price to the seller; and receiving from the seller a confirmation of the seller's acceptance of the recommended sale price and using the recommended sale price as the selected sale price;

wherein the information relating to the standard identification code is used to present the good for sale.

7. A computer-implemented method for listing an independent seller's good for sale using a CPU, a memory operatively connected to the CPU and a program stored in the memory and executable by the CPU for presenting the good for sale on a website, the method comprising:

receiving from a seller information identifying a good, the information comprising a series of tones generated by depression of keys of a telephone;

retrieving information relating to the good from a database;

determining a recommended sale price for the good, the sale price being information relating to the good that is retrieved from the database;

providing the recommended sale price to the seller;

receiving from the seller a selected sale price; and presenting the good for sale on a website;

wherein said information is used to present the good for sale.

8. A computer-implemented method for listing an independent seller's good for sale using a CPU, a memory operatively connected to the CPU and a program stored in the memory and executable by the CPU for presenting the good for sale on a website, the method comprising:

receiving from a seller information identifying a good, the information comprising a series of tones generated by depression of keys of a telephone;

retrieving information relating to the good from a database;

determining a recommended sale price for the good, the sale price being information relating to the good that is retrieved from the database;

providing the recommended sale price to the seller;

receiving from the seller a confirmation of the seller's acceptance of the recommended sale price and using the recommended sale price as the selected sale price; and presenting the good for sale on a website;

wherein said information is used to present the good for sale.

9. A computer-implemented method for listing an independent seller's good for sale using a CPU, a memory operatively connected to the CPU and a program stored in the memory and executable by the CPU for presenting the good for sale on a website, the method comprising:

receiving from a seller a series of tones comprising tones generated by depressing keys of a telephone in a sequence corresponding to an alphanumeric sequence of a standard identification code;

adding the good to a virtual inventory of goods being offered for sale;

retrieving from the memory information associated with the standard identification code, the information relating to the good; and presenting the good for sale on a website to display the information retrieved from the memory using the standard identification code.

10. The method of claim 9, wherein the series of tones further comprises tones generated by depressing the telephones keys to identify a characteristic of the good that is incapable of being discerned from the standard identification code.

11. The method of claim 9, wherein the retrieving from the memory information associated with the standard identification code, and the presenting the good for sale on a website are performed after a buyer inquires about the good.

12. The method of claim 9, wherein the retrieving from the memory information associated with the standard identification code, and the presenting the good for sale on a website are performed after a buyer's search for the good.

13. The method of claim 9, wherein adding the good to a virtual inventory of goods being offered for sale comprises storing in the memory the standard identification code.

14. The method of claim 9, wherein retrieving from the memory information associated with the standard identification code comprises retrieving a recommended sale price for the good, the method further comprising providing the recommended sale price to the seller.

15. The method of claim 9, further comprising:

receiving a seller identification code that is recognizable to identify seller information previously provided in association with the seller.

16. The method of claim 15, wherein the seller identification code comprises tones generated by depressing the telephone's keys in a sequence corresponding to an alphanumeric sequence associated with the seller.

17. The method of claim 15, wherein the seller identification code is a telephone number of the telephone from which the seller is calling, and wherein receiving a seller identification code comprises recognizing the telephone's telephone number by a caller identification technique.

18. The method of claim 9, wherein presenting the good for sale comprises:

displaying via the website information provided by the seller; and displaying via the website additional information not provided by the seller, the additional information being retrieved from a database, the additional information being stored in the database in association with the standard identification code provided by the seller.

* * * * *